US011421650B2

(12) United States Patent
Ennis et al.

(10) Patent No.: US 11,421,650 B2
(45) Date of Patent: Aug. 23, 2022

(54) TOWERLESS VERTICAL-AXIS WIND TURBINE

(71) Applicant: National Technology & Engineering Solutions of Sandia, LLC, Albuquerque, NM (US)

(72) Inventors: Brandon L. Ennis, Albuquerque, NM (US); Joshua Paquette, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 49 days.

(21) Appl. No.: 16/900,024

(22) Filed: Jun. 12, 2020

(65) Prior Publication Data

US 2020/0392940 A1    Dec. 17, 2020

Related U.S. Application Data

(60) Provisional application No. 62/860,513, filed on Jun. 12, 2019.

(51) Int. Cl.
| F03D 3/06 | (2006.01) |
| F03D 13/25 | (2016.01) |
| F03D 7/06 | (2006.01) |
| F03D 3/00 | (2006.01) |

(52) U.S. Cl.
CPC ............. *F03D 3/062* (2013.01); *F03D 3/005* (2013.01); *F03D 3/064* (2013.01); *F03D 7/06* (2013.01); *F03D 13/25* (2016.05); *F05B 2240/31* (2013.01)

(58) Field of Classification Search
CPC .......... F03D 3/005; F03D 3/062; F03D 3/064; F03D 7/06; F03D 13/20; F03D 13/25; F05B 2240/212; F05B 2240/31; F05B 2240/312
See application file for complete search history.

(56) References Cited

U.S. PATENT DOCUMENTS

| 4,624,624 | A | * | 11/1986 | Yum | ........................ | F03D 3/061 |
| | | | | | | 416/87 |
| 7,893,556 | B1 | | 2/2011 | Ryznic et al. | | |
| 8,118,538 | B2 | * | 2/2012 | Pao | ........................ | E02D 27/425 |
| | | | | | | 415/115 |
| 8,215,913 | B2 | * | 7/2012 | Lux | ........................ | F03D 3/065 |
| | | | | | | 416/195 |
| 9,267,490 | B1 | * | 2/2016 | Paquette | ................. | F03D 3/061 |
| 2008/0267777 | A1 | | 10/2008 | Lux | | |
| 2009/0074581 | A1 | * | 3/2009 | Burlot | ..................... | F03D 3/005 |
| | | | | | | 416/204 R |
| 2011/0042958 | A1 | | 2/2011 | Vander Straeten | | |
| 2011/0236181 | A1 | | 9/2011 | Wygnanski | | |
| 2012/0224968 | A1 | | 9/2012 | Lux | | |
| 2014/0147248 | A1 | | 5/2014 | Akimoto | | |

FOREIGN PATENT DOCUMENTS

WO    2019/238437 A1    12/2019

* cited by examiner

*Primary Examiner* — Richard A Edgar
*Assistant Examiner* — Jason G Davis
(74) *Attorney, Agent, or Firm* — Daniel J. Jenkins

(57) ABSTRACT

The present disclosure is directed to towerless vertical-axis wind turbines with pre-tensioned rotors. The present disclosure is further directed to a vertical-axis wind turbine (VAWT) with supported blade ends (e.g., Darrieus type) which replaces the center tower with tensioned supports, such as tensioned guy wires, and blade pre-load.

19 Claims, 3 Drawing Sheets

TOWERLESS VERTICAL-AXIS WIND TURBINE

CROSS-REFERENCE TO RELATED PATENT APPLICATIONS

This patent application claims priority from and the benefit of U.S. Provisional Patent Application Ser. No. 62/860,513, filed Jun. 12, 2019, entitled "TOWERLESS VERTICAL-AXIS WIND TURBINE," which is hereby incorporated by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to wind turbines, and more particularly to vertical-axis wind turbines.

BACKGROUND

Wind energy is rapidly emerging as one of the most cost-effective forms of energy generation with an ever-increasing installed capacity around the world. Wind turbines are generally categorized as Horizontal-Axis Wind Turbines (HAWT) or Vertical-Axis Wind Turbines (VAWT). HAWTs feature cantilevered blades, a high blade tip velocity ratio, a proven high power generation efficiency, and low start-up torque. In contrast, VAWTs possess several inherent advantages over HAWTs. For example, VAWTs do not have to be yaw-adjusted to follow the changing direction of prevailing wind, and consequently handle gusts more efficiently. Being omni-directional, VAWTs can inherently handle turbulent winds found in the atmosphere due to their vertical rotation compared to HAWTs, which experience yaw offset misalignment in these conditions. Large VAWTs can also have higher aerodynamic efficiency compared to HAWTs due to the effective double passage of the blades through the wind field per rotation. The main advantage of VAWTs for floating offshore wind energy systems is that they have a substantially lower center of mass and mass moment of inertia which produces benefits for the floating platform which has to counteract mass above the water level with added mass below the water level. The platform-level placement of the drivetrain cannot be wholly replicated by a HAWT which requires a rotation axis that is greater than the blade radius above the water level. Accessibility to the drive components is another advantage for VAWTs with the low placement of the drive components. However, previous VAWT designs have not distinguished themselves substantially from HAWTs and have consisted of multiple blades and a massive support tower. The disadvantage of these VAWT configurations which require a center vertical support is that it adds substantial mass to the VAWT.

Floating offshore wind turbines are the next frontier for wind energy and would enable wind energy generation for locations with land limitation or limited wind resource on land. However, floating offshore wind plants are at a major disadvantage to alternative energy sources, including land-based wind energy systems, due to accessibility and large capital expenses required to simply keep the turbine above water. The ideal wind energy system would eliminate all mass and cost that is not directly capturing energy from the wind. For a floating offshore wind turbine, this objective is even more significant as increased mass above the water level must be supported by larger and more expensive floating platforms. By this metric, VAWTs are ideal for floating offshore sites and have several advantages over HAWTs at this scale. Large VAWTs have improved aerodynamic efficiency over HAWTs in addition to a lower center of pressure which reduces the thrust overturning moment. More significantly, the platform-level placement of the drivetrain greatly reduces the demands placed on the floating platform and its mass and cost. VAWTs have a great potential to increase energy capture and decrease system mass.

Darrieus VAWT rotors may have the greatest potential to reduce the turbine-platform system levelized cost of energy (LCOE). The Darrieus rotor reduces the topside mass through support of the blade ends which eliminates cantilevered bending moments and instead carries aerodynamic and centrifugal loads axially along the blade. However, similar to HAWTs, the Darrieus VAWT has always had a very tall center tower support, which may account for over 80% of the rotor mass while producing none of the power. A disadvantage of the Darrieus VAWT results from the supported ends which prohibits blade pitching to reduce aerodynamic loads in storm conditions. Previous designs have relied on stall-regulated airfoils to reduce aerodynamic load in high wind speeds near the rated power wind speed.

What is needed is a VAWT that overcomes these and other deficiencies by reducing the amount of mass above the support platform and can address the challenges with the lack of blade pitch control to enable the benefits of the Darrieus design to be fully realized.

BRIEF DESCRIPTION OF THE DRAWINGS

Wherever possible, the same reference numbers will be used throughout the drawings to represent the same parts.

SUMMARY OF THE DISCLOSURE

Figure 1:
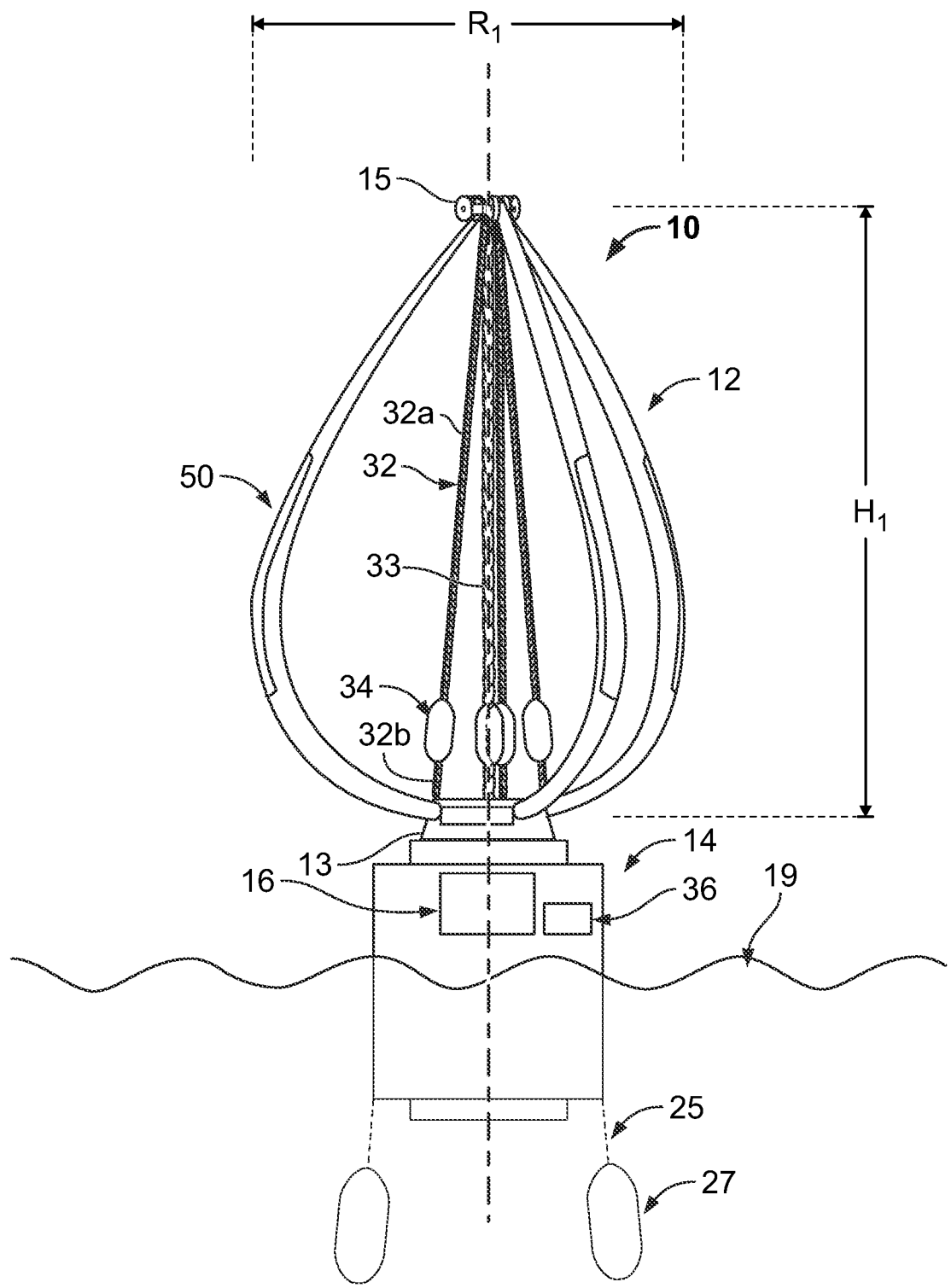
FIG. 1 illustrates a VAWT shown in an operational configuration according to an embodiment of the disclosure.

The present disclosure is directed to a vertical-axis wind turbine including two or more blades having an upper end, a lower end and a height, and one or more flexible connectors attached to the two or more blade, each flexible connector of the one or more flexible connections having a length. The vertical-axis wind turbine does not include a center axis rigid support attached to the two or more blades upper ends The present disclosure is further directed to a method of controlling a vertical-axis wind turbine including lengthening and shortening one or more flexible connectors attached to two or more blades of the vertical-axis wind turbine to adjust tension upon the two or more blades by increasing and decreasing the axial length of the two or more blades.

The present disclosure is also further directed to a method of supporting two or more blades of a vertical-axis wind turbine including attaching one or more flexible connectors to upper portions of the two or more blades to compress the blades into an operational configuration. The two or more blades are not connected to a rigid, vertical support.

An advantage of the present disclosure is that above platform mass of an offshore VAWT rotor is reduced thereby upwards of fifty percent.

Another advantage of the present disclosure is the ability to implement rotor area control which reduces the blade radius by increasing the distance between the lower and upper control points. This innovation reduces torque on the system with the reduced radius and lowers the aerodynamic loads by effectively pitching the airfoil sections to operate at lower angles of attack. This feature enables storm load alleviation and high wind speed regulation without simply requiring a very large braking system.

Another advantage of the present disclosure is that the disclosed design capitalizes on the improved mechanical performance of composites and metals in tension compared to compression. By pre-stressing the rotor blades and holding them in position through tensioned center, supports the blades can operate with a shift towards tensile loads which have a higher strength than compressive loads and can remove the compressive failure mechanism caused by global buckling (which a traditional rigid tower would have to be designed for). This enables more of the material strength to be utilized in the turbine design which in turn further reduces the material mass requirements.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to towerless vertical-axis wind turbines (VAWTs) with pre-tensioned rotors. The disclosed vertical-axis wind turbine (VAWT) has flexible connectors that support the blade ends (e.g., Darrieus type), which replaces the center tower with tensioned supports, such as tensioned guy wires, and blade pre-load. The lower blade ends carry the mass of the rotor, the upper blade ends (connected via joints or rigid connection to each other) are held in place through tensioned, flexible, adjustable supports (such as wire rope or cable) and through connection to the other blade(s). The tensioned supports may be mounted at angles from the upper portion to carry lateral loads in addition to the vertical loads caused by blade pre-load, and rotate with the blades (e.g., are part of the VAWT rotor).

The disclosed VAWT results in lower tower top mass and roll/pitch mass moments of inertia compared to traditional VAWTs, greatly minimizing platform and system costs. This design can reduce rotor mass by upwards of 50% compared to the traditional Darrieus VAWT with center tower. In some VAWTs, the VAWT tower constituted over 80% of the rotor mass. This is especially significant when considering that the cost for floating offshore wind turbines is dominated by platform costs, and the platform costs scale with topside mass (turbine, generator, tower, etc.) and particularly mass that is further from the water level (blade mass, generator mass for HAWTs, tower mass, etc.). Reducing the total mass reduces the buoyancy requirements from the platform, reducing the height of the center of mass above the water line (the roll/pitch mass moments of inertia) reduces the tow-out stability requirements of the platform. Both inertial metrics are reduced by the disclosed towerless VAWT.

The disclosed VAWT eliminates the need for a central support tower and greatly reduces the mass and requirements placed on the rotor support platform. In offshore applications, such a reduction in mass greatly reduces the support requirements for floating platforms by utilizing pre-tensioned Darrieus blades where the lower blade joint supports the rotor weight and the upper blade joint is prevented from expanding upwards through tensioned wire rope type supports. Similar to a bow, the disclosed design compresses the blade and results in a rigid rotor despite removal of the massive tower and a significant reduction in the rotor weight (towers are part of the rotor for VAWTs). Using this approach, the disclosed VAWT can also change diameter through control of the wire length, which can reduce storm and hurricane loads on the system.

Compared to traditional HAWT turbines, traditional Darrieus VAWT design likely increases power conversion from the wind, due to the improved aerodynamic efficiency of large VAWTs. The towerless VAWT of the present disclosure further enables reductions in major system mass categories (e.g., floating platform, tower, nacelle (part of the platform for a VAWT)). While the rotor mass will likely be higher for this concept compared to a HAWT rotor (which does not include the tower) at current scales, the system benefits from removing the tower mass (impossible for a HAWT) and substantially reducing the mass moments of inertia compared to a HAWT are expected to result in a lower system cost. As with other Darrieus VAWTs, the hub for the rotor of the present disclosure does not require pitch bearings or drive, but the presently disclosed VAWT enables the ability to vary the rotor diameter which provides control for reducing storm loads and effectively pitching the blades by airfoil angle of attack changes at different rotor diameter settings.

Figure 2:
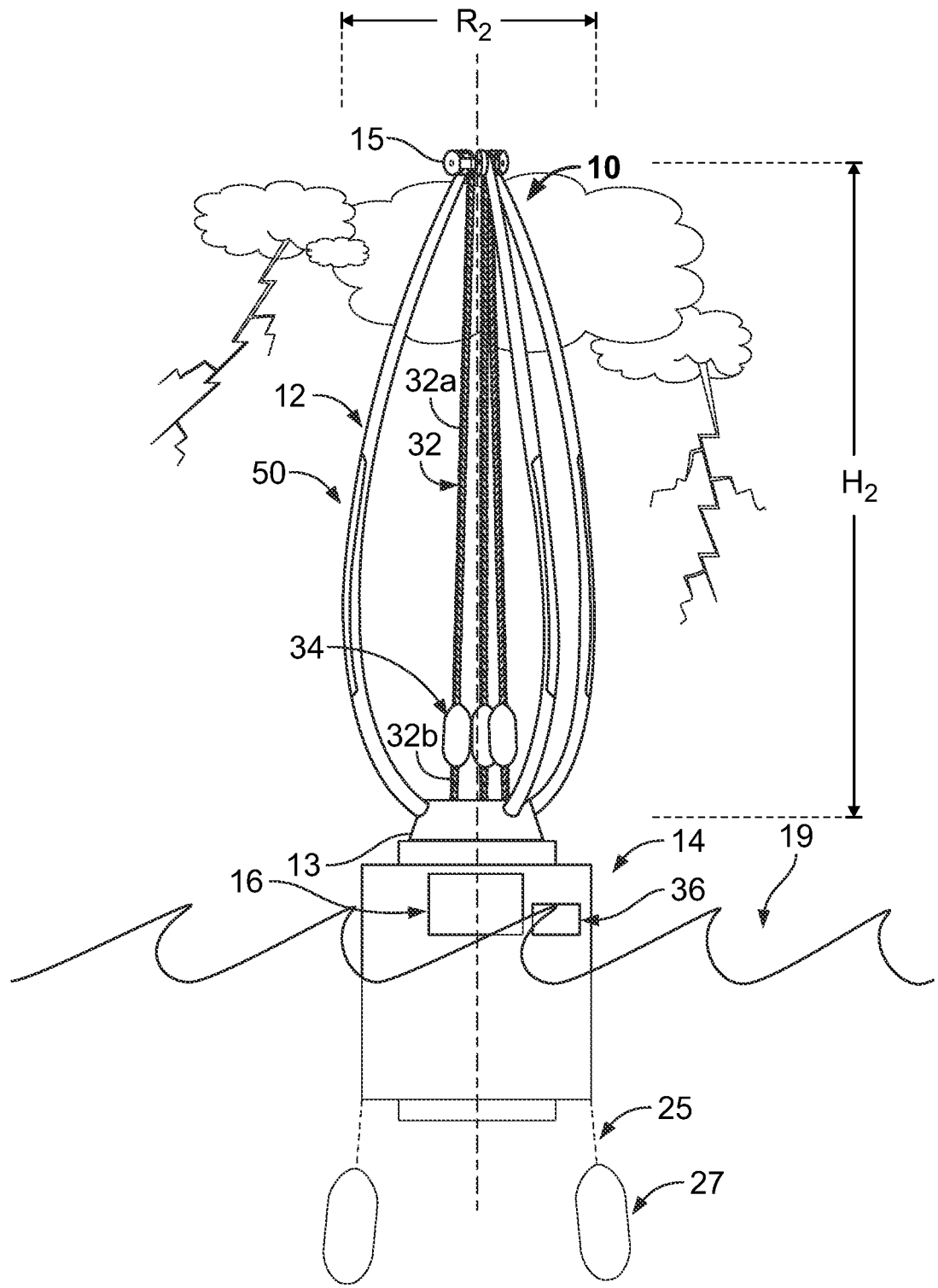
FIG. 2 shows the VAWT of FIG. 1 in a stowed configuration.

FIGS. 1 and 2 illustrate a VAWT 10 according to an embodiment of the disclosure. The VAWT 10 includes blades 12 and a support platform or base 14. The base 14 includes a torque control system 16, which includes a power generation unit including a shaft, motor and/or generator, the configuration and controls of which being well known in the art. In this exemplary embodiment, the base 14 is a floating base anchored via mooring lines 25 and potentially including mooring controls 27 in a body of water 19. In other embodiments, the base 14 may be attached to a solid structure, such as, but not limited to a concrete slab or land.

Figure 4:
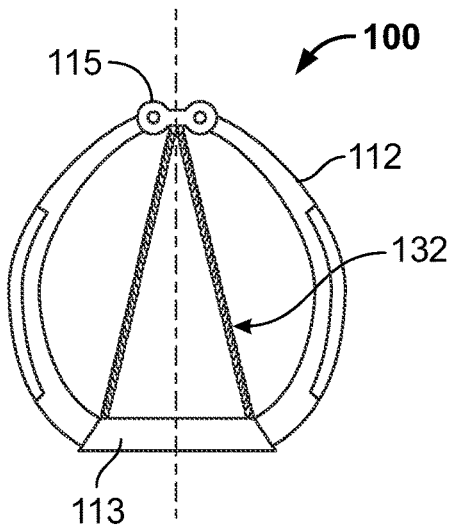
FIG. 4 shows a partial illustration of a two blade VAWT in an operational configuration according to an embodiment of the disclosure.
Figure 5:
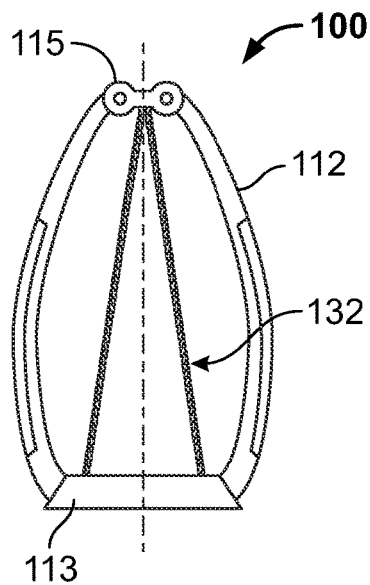
FIG. 5 shows the two blade VAWT of FIG. 4 in a stowed configuration.

In this exemplary embodiment, VAWT 10 has three blades 12. The blades 12 are equally radially distributed around a central vertical axis, shown as vertical dashed line, of VAWT 10. In other embodiments, the VAWT 10 may have two or more blades, for example two, three, four or five blades. FIGS. 4 and 5 illustrate a VAWT having two opposing blades, the embodiment of which is discussed in more detail below. In this exemplary embodiment, the blades 12 have a straight design with no forward or rearward sweep. In other embodiments, the blades may have a swept or helical, twisted design.

The blades 12 may be made of any materials that have sufficient resistance to fatigue failure even when subject to long-term periodic loading at the RPMs at which the turbine is expected to operate, and will depend on the expected wind strength and regularity at the turbine site and on the mechanical and electrical properties of the gearbox and generator, etc. Glass- and carbon-fiber reinforced polymers, composite and laminate materials, wood, as well as metals such as aluminum (either solid or in profiles) are examples of suitable materials. The blades may be constructed of one or more materials. In an embodiment, the blades are constructed of two or more materials to control the flex and/or deformation of the blades under stress or tension, especially when the blades are being stressed or relaxed to shortening or lengthening the flexible connectors 32 (see discussion below). The blades 12 may also include one or more control surfaces 50, such as morphing trailing edge flaps, etc., (which can be used to control the rotor dynamics and as a means to statically pitch the blades and reduce loads).

The blades 12 are connected to or linked at a blade bottom end with a bottom connector 13. The bottom end being defined as the end proximate the base. The blade connection to the bottom connector 13 may be fixed or adjustable. In an embodiment, the connection may be hinged or pinned. The bottom connector 13 is connected to a driving shaft (not shown) contained within a base 14. The driving shaft transmits torque from the rotating blades via a geared or direct drive system to a shaft of an electrical generator, and as stated above, the configurations thereof being known in the art. In other embodiments, other power generation unit configurations are possible.

The blades 12 are connected or link to one another at a blade top end by a top connector 15. The top end being defined as the end proximate the top connector 15. In this exemplary embodiment, the top connector 15 is a pinned connector that attaches the blades 12 to the top connector with connector pins (not shown). In other embodiments, the top connector may be a hinged connector, a pin connector or other connector. In an embodiment, the top connector allows the angle of attachment of the blades to the connector to flex or vary at the angle of connection. In other embodiments, the top and or bottom connector may be omitted, and the flexible connectors may be connected directly to the blades.

The VAWT 10 includes flexible links or connectors 32 that are used to draw the blade top ends downward towards the blade bottom ends, thereby shortening the overall blade height H along the VAWT central axis and increasing blade radius about the VAWT central axis, or to distance the opposing ends from one another, thereby lengthening the overall blade height along the VAWT central axis and decreasing the blade radius about the VAWT central axis. In this exemplary embodiment, the flexible connectors 32 are attached to blade top ends via a connection to the top connector 15. Also, in this exemplary embodiment, the flexible connectors 32 are attached to blade bottom ends via a connection to the bottom connector 13. In other embodiments, the flexible connectors 32 may be attached directly to the top and/or bottom ends of the blades 12. In this exemplary embodiment, the VAWT 10 uses three flexible connectors 32. In other embodiments, the VAWT 10 may use one or more flexible connectors. For example, in an embodiment, the VAWT 10 may use one centralized flexible connector 33 that is attached to the top connector 15 and bottom connector 13, and which is aligned with the vertical axis. In another embodiments, the VAWT 10 may use two flexible connectors for each blade 12, so for example, for a three blade VAWT, six flexible connectors may be used. In other embodiments, two or more flexible connectors may be used for each blade. In this exemplary embodiment, the flexible link 32 is a steel cable. In other embodiments, the flexible link 32 may be cables, wires, rods, chains or other flexible extensions. The flexible link 32 may be formed of a metal, composite, carbon fiber or other high strength materials.

Referring to FIG. 1, the blades 12 are at an operational height $H_1$, and the resulting blade configuration results in a VAWT blade operational radius $R_1$. Referring to FIG. 2, the flexible connectors 32 have been lengthened, resulting in a feathered or stowed height $H_2$ and stowed radius $R_2$. In such a manner, oscillations may be dampened and/or operational control of the VAWT 10 can be adjusted based on power demand and/or weather, for example. This can be used to reduce diameter and area of the rotor as well, as a means to reduce thrust and torque in storm conditions, or during operation and power production of the turbine.

In the stowed configuration of FIG. 2, the flexible connectors 32 are maintained at an amount of tension necessary to apply an amount of force to the blades 12 that result in sufficient stress in the connectors 32 to prevent snapping loads caused by going slack. The centralized flexible connector 33 is not shown for clarity. In the operational configuration shown in FIG. 1, the flexible connectors 32 have been shortened, resulting in greater tension in the flexible connects 32 and increased force being applied to the blades 12 that results in greater stress in the blades 12 which is partially alleviated through centrifugal stiffening as the rotor operates. In an application as shown in FIG. 1, the body of water 19 is at an operationally acceptable sea state and the VAWT 10 is in an operational configuration, as compared to FIG. 2, wherein the body of water 19 is not at an operationally acceptable sea state, and the VAWT 10 is stowed.

In this exemplary embodiment, the VAWT 10 includes three wire length adjustment units (adjustment units) 34 attached to each of three corresponding flexible connectors 32. In other embodiments, the VAWT 10 may include a wire length control unit for one or more of the flexible connectors. In other words, not each flexible connector may have a wire length control unit. The adjustment units 34 are mechanical devices that shorten or extend the flexible links, thereby also tensioning or relaxing stresses in the blades 12 in addition to changing the airfoil angles of attack. In this exemplary embodiment, the adjustment units 34 include a reversible motor, spindle for winding the flexible connector thereon, and power and control modules, the details of which are not shown but components and configuration thereof are well known within the art. In other embodiments, the wire length control units may include spindles, spools, winches, screw devices, mechanisms and/or hydraulic systems that can shorten or lengthen a flexible link. In other embodiments, the VAWT may include multiple wire length adjustment units for one or more of the flexible links 32 to provide redundancy.

In this exemplary embodiment, the adjustment units 34 are disposed in the length of the flexible links 32 between an upper flexible link portion 32a and a lower flexible link portion 32b. In this example, the adjustment units 34 shortens and lengthens the upper flexible link portion 32a, while the lower flexible link portion 32b remains a constant length, thereby shortening or lengthening the overall length of flexible link portion 32. In other embodiments, the adjustment units 34 may be disposed in the length of the flexible link and/or disposed at an end of the flexible link. For example, in an embodiment, the wire length control units may be disposed within and/or connected to the bottom connector 13. In another embodiment, the wire length control units may be disposed within the base 14, with the flexible connectors extending thereto. In an embodiment one or more of the flexible connectors may connect to a single wire length control unit. In yet another embodiment, all of the flexible connectors may connect to a single wire length control unit so that the lengths of the flexible connectors may be adjusted simultaneously.

The VAWT 10 further includes a wire length control unit (control unit) 36 that controls the adjustment units 34 by sending commands to the adjustment units 34 to shorten or lengthen the flexible links 32. The control unit 36 includes a processor that includes memory storing an operational control architecture that receives one or more inputs and uses a predetermined control software process to determine the length of the flexible links. In this exemplary embodiment, the control unit 36 receives an input from a wind sensor 38, shown on FIG. 3. The control unit 36 includes an operator interface to receive operator commands, the operator interface may be any suitable interface and may be connected via wire or wireless connections. In an embodiment, the operator may input commands for maintenance operations. In other embodiments, the control unit 36 may control the length of the flexible links by any combination of sensor inputs and/or operator commands. For example, the control unit may be autonomous and use sensor inputs to determine the flexible link length. In other embodiments, the sensor inputs may include, but are not limited to environmental and operational conditions such as but not limited to wind speed, wave height, platform acceleration and rotor stress states. In other embodiments, the VAWT 10 may include one or more control units to provide control redundancy.

In an alternative embodiment, the VAWT 10 does not include adjustment units 34 and the wire length control unit 36. In this embodiment, the height H₁ of FIG. 1 is fixed. The rotor architecture is as described in the text referencing FIG. 1 to include the stressed blades with tensioned, flexible connectors instead of the traditional rigid tower.

Figure 3:
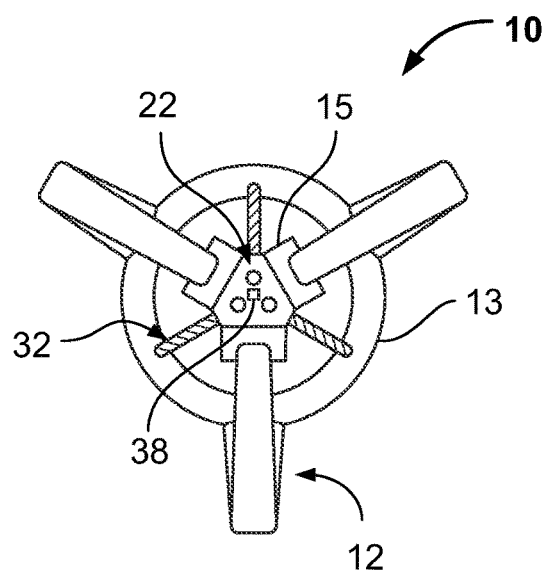
FIG. 3 shows a partial top view of FIG. 1.

FIG. 3 is a partial top view of VAWT 10 of FIG. 1. As can be seen in FIG. 3, the top connector 15 has three connector points 22 where the flexible connectors 32 are attached to the top connector. FIG. 3 also shows the attachment of wind sensor 38.

Figure 6:
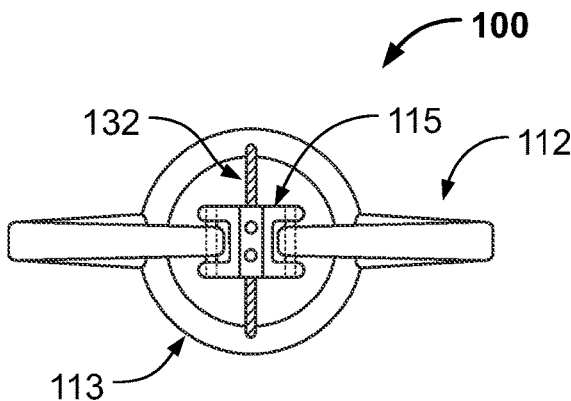
FIG. 6 shows a partial top view of FIG. 4.

FIGS. 4 and 5 are partial illustrations of a two blade VAWT 100 according to an embodiment of the disclosure, shown in operational and stowed configurations, respectively. FIG. 6 is a top view of VAWT 100 shown in FIG. 4. As can be seen in FIGS. 4, 5 and 6, the VAWT 100 includes blades 112 connected at an upper end by top connector 115, a lower connector 113, and flexible connectors 132. In this exemplary embodiment, the VAWT 100 includes two flexible connectors 132, but in other embodiments, the VAWT 100 may include one or more flexible connectors 132. In this exemplary embodiment, wire length adjustment units (adjustment units) are disposed within the lower connector 113 and are not shown.

Figure 7:
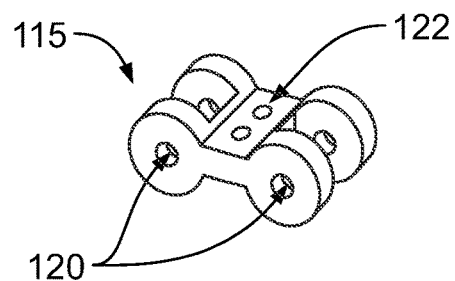
FIG. 7 is an illustration of a two blade top connector according to an embodiment of the disclosure.

FIG. 7 illustrates the top connector 115 of FIGS. 4, 5 and 6. As can be seen in FIG. 7, the top connector 115 includes flexible connector attachment points 122 and pin slots 120 for attaching blades 112 thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A vertical-axis wind turbine, comprising:
   two or more blades having an upper end, a lower end and a height; and
   one or more flexible connectors attached to the two or more blades, each flexible connector of the one or more flexible connections having a length;
   one or more adjustment units that increase and decrease the length of the one or more flexible connectors that increases or decreases the height of the two or more blades; and
   a control unit that sends a command to the one or more adjustment units to increase and decrease the length of the one or more flexible commands;
   wherein the vertical-axis wind turbine does not include a center axis rigid support attached to the two or more blades upper ends.

2. The vertical-axis wind turbine of claim 1, wherein the control unit includes a processor that receives commands from one or more sensors.

3. The vertical-axis wind turbine of claim 2, wherein the one or more sensors provide sensed data of one or more parameters selected from the group consisting of wind speed, wave height, platform acceleration and rotor stress states to the control unit.

4. The vertical-axis wind turbine of claim 1, further comprising:
   a base connector attached to the lower end of the one or more flexible connectors, wherein the base connector is attached to a base.

5. The vertical-axis wind turbine of claim 4, wherein the base is a sea platform.

6. The vertical-axis wind turbine of claim 1, further comprising:
   a top connector attached to the upper end of the two or more blades.

7. The vertical-axis wind turbine of claim 6, wherein the upper end of the two or more blades are attached to the top connector by a pin or hinge.

8. The vertical-axis wind turbine of claim 1, wherein at least one of the one or more adjustment unit comprises a motor and a spool for winding thereupon a portion of the length of the one or more flexible connectors.

9. The vertical-axis wind turbine of claim 1, wherein the one or more flexible connectors include a central flexible connector aligned with a vertical axis of the vertical-axis wind turbine.

10. The vertical-axis wind turbine of claim 1, wherein the one or more adjustment units is one adjustment unit.

11. The vertical-axis wind turbine of claim 1, wherein the one or more flexible connectors are steel cables.

12. A method of controlling a vertical-axis wind turbine, comprising:
   lengthening and shortening one or more flexible connectors attached to two or more blades of the vertical-axis wind turbine to adjust tension upon the two or more blades by increasing and decreasing the axial length of the two or more blades.

13. The method of claim 12, wherein the one or more flexible connectors is lengthened or shortened in response to one or more sensed conditions.

14. The method of claim 13, wherein the one or more sensed conditions is selected from the group consisting of wind speed, wave height, platform acceleration and rotor stress states.

15. The method of 12, wherein the one or more flexible connectors includes a central flexible connector aligned with the vertical axis of the vertical-axis wind turbine.

16. The method of claim 12, wherein the two or more blades are lengthened and shortened by a single length adjustment unit.

17. A method of supporting two or more blades of a vertical-axis wind turbine comprising:
   attaching one or more flexible connectors directly to upper portions of the two or more blades to compress the blades into an operational configuration;
   one or more adjustment units that increase and decrease the length of the one or more flexible connectors with an adjustment unit that increases or decreases the height of the two or more blades; and
   sending a command from a control unit to the adjustment unit to increase and decrease the length of the one or more flexible commands.

18. The method of claim 17, wherein the one or more flexible connectors is a metal or composite cable.

19. The method of claim 17, wherein a bottom portion of the two or more blades is connected to a sea platform.

\* \* \* \* \*